United States Patent [19]

Tanuma et al.

[11] Patent Number: 4,865,918

[45] Date of Patent: Sep. 12, 1989

[54] SANDWICH STRUCTURES HAVING IMPROVED IMPACT RESISTANCE

[75] Inventors: Itsuo Tanuma, Sayama; Hideo Takeichi, Tanashi; Masashi Segawa, Kodaira; Toshio Honda, Akigawa, all of Japan

[73] Assignee: Bridgestone Corporation, Tokyo, Japan

[21] Appl. No.: 74,171

[22] Filed: Jul. 16, 1987

[30] Foreign Application Priority Data

Jul. 16, 1986 [JP] Japan ................... 61-165606

[51] Int. Cl.$^4$ ............................................... B32B 15/04
[52] U.S. Cl. .................... 428/409; 428/410; 428/437; 428/902
[58] Field of Search .................... 428/409, 410, 411.1, 428/437, 460, 412, 902

[56] References Cited

U.S. PATENT DOCUMENTS

| | | | |
|---|---|---|---|
| 2,176,997 | 10/1939 | Marini | 428/437 X |
| 2,202,160 | 5/1940 | Marks | 428/437 |
| 2,837,454 | 6/1958 | Watkins et al. | 428/437 |
| 3,458,388 | 7/1969 | Moynihan | 428/437 X |
| 4,293,615 | 10/1981 | Bowen et al. | 428/411.1 X |
| 4,663,235 | 5/1987 | Fock et al. | 428/437 |
| 4,683,172 | 7/1987 | Le Grand et al. | 428/437 X |

*Primary Examiner*—Nancy A. B. Swisher
*Attorney, Agent, or Firm*—Sughrue, Mion, Zinn, Macpeak, and Seas

[57] ABSTRACT

A sandwich structure having an improved impact resistance comprises two outer plates and an intermediate layer interposed therebetween. The intermediate layer is comprised of plural films having a bonding force therebetween lower than that between intermediate layer and outer plate.

12 Claims, No Drawings

SANDWICH STRUCTURES HAVING IMPROVED IMPACT RESISTANCE

BACKGROUND OF THE INVENTION

1. Field of the Invention

This invention relates to a sandwich structure having an excellent impact resistance, and more particularly to a sandwich structure comprising two same or different outer plates and an intermediate layer interposed therebetween. To be more concrete, the invention relates to a sandwich structure having an excellent impact resistance which can prevent the penetration of solid over a wide temperature range even when the solid comes into collision with the outer surface of the sandwich structure at a higher speed or a higher acceleration speed and can lessen the scattering of broken pieces in all directions when the structure is broken by the collision of the solid.

2. Related Art Statement

In this type of the sandwich structure, various materials such as metals, ceramics, organic high polymers and so on can be used as an outer plate. In case of using ceramics, particularly transparent glass, when a transparent resin is interposed between the transparent glasses to form a sandwich glass, since the glass is conspicuous in the brittleness, the impact resistance of the sandwich glass is fairly poor. Therefore, it is demanded to provide optical transmission sandwich glasses having an improved impact resistance as a windshield member for buildings, airplanes and vehicles, particularly automobiles. Heretofore, the sandwich glasses have been manufactured by using a transparent resin having a large elongation at about room temperature, such as polyvinyl butyral resin or the like as an intermediate layer. In the actual production, however, it is required to enhance the impact resistance as far as possible in order to prevent the penetration of driver's head through the windshield glass for automobile in collision accident. For this purpose, it is usually attempted to elaborate various special plans.

For example, in order to improve the impact resistance, the sandwich glass is produced by intentionally decreasing the bonding force between outer glass plate and polyvinyl butyral resin layer, because the penetration resistance is poor when the bonding force is high. In this method, the polyvinyl butyral resin layer is left to stand in a room held at a constant humidity to incorporate a given amount of water into the layer and then contact bonded to the glass plate by heating, whereby the bonding force is restrained at a low value. According to the above method, the productivity is lowered, and also the falling-off and scattering of sharp broken glass pieces can not completely be prevented when the glass is broken by the collision, because the bonding force inherent to polyvinyl butyral resin layer is restricted to a low value in use as a defect of product quality. That is, it is impossible to simultaneously and completely satisfy the penetration resistance and the performance for preventing the scattering of glass pieces. As another great drawback, the penetration resistance improved by the control of water content is restricted within a very narrow temperature range. In general, the penetration resistance is maintained only at a temperature within a range of 15° C.~25° C. and lowers at a temperature outside the above range. Particularly, the penetration resistance rapidly lowers at a temperature above 30° C. Since the sandwich glass is actually used under conditions over a wide temperature range, the above drawback is a serious problem to be solved, which is overlooked without knowing why up to the present.

SUMMARY OF THE INVENTION

The inventors have made various studies in order to solve the aforementioned problems and found that these problems are solved by a sandwich structure as mentioned later, and as a result the invention has been accomplished.

According to the invention, there is the provision of a sandwich structure having an improved impact resistance, comprising two same or different outer plates and an intermediate layer interposed at least two same or different films so that bonding force of at least one contact surface between the mutual films is made lower than bonding force of a contact surface between each outermost surface of the intermediate layer and each of the outer plates.

DESCRIPTION OF THE PREFERRED EMBODIMENTS

When the sandwich structure according to the invention is a sandwich glass, a transparent resin forming the film for intermediate layer is selected from the group consisting of ethylene-vinyl acetate copolymer, partially saponified ethylene-vinyl acetate copolymer, polyvinyl butyral, polyvinyl formal, urethane polymer and the like. When using a laminate of plural films each made from the above resin as an intermediate layer, the object of the invention is achieved by restraining the bonding force between the films to a value lower than the bonding force between the intermediate layer and the outer glass plate at the final product state.

Such a low bonding is easily attained by applying a substance capable of reducing the bonding force such as a releasing agent to the surface of the film at the boundary between films intending the low bonding, or by previously kneading the releasing agent into the resin of the film not contacting with the glass plate. Moreover, when the polyvinyl butyral resin is used as the transparent resin, since this resin has a blocking property, i.e. a property that the resulting films closely adhere with each other in the storing or transportation, it is necessary to prevent the blocking by cooling, use of dusting powder, insertion of releasing paper or the like. Therefore, it is desired to use ethylene-vinyl acetate copolymer (hereinafter abbreviated as EVA) requiring no use of the above means and being economically useful. In this connection, sandwich glasses using EVA as an intermediate layer have already been proposed in Japanese Patent laid open No. 57-196,747, U.S. Pat. No. 4,600,627, Japanese Patent Application No. 60-287,987 and the like. The invention is to more improve the impact resistance of this sandwich glass, which is preferably achieved by the followings. That is, the intermediate layer is comprised by laminating transparent films of EVA resin and films of a transparent material having a breaking strength larger than that of EVA resin and preferably a high modulus of elasticity, i.e. high-strength material.

When the high-strength material is used as a film other than outermost film in the intermediate layer, it is not necessarily required to have a bonding force to glass plate. Such a material includes polyethylene terephthalate having an excellent transparency, polyamides, aromatic polyamides, polyester polyethers, polysulfones, polyimides and the like. Among them, polyethylene terephthalate (hereinafter abbreviated as PET) is most preferable from viewpoints of film smoothness, transparency, strength, modulus of elasticity and economical reasons. Thus, the intermediate layer may be constructed by alternately piling the film of transparent resin having the improved bonding property and the film of high-strength material having a low bonding property one upon the other, provided that the outermost film is made from the transparent resin having the improved bonding property. In this case, the bonding force between the transparent resin film and the high-strength material film is previously controlled so as to indicate a level lower than the bonding force between glass and transparent resin film at the final product state, whereby the most preferable intermediate layer is obtained.

The invention will be further described in detail with respect to a preferable embodiment of the sandwich glass.

The intermediate layer is preferably composed of a laminate alternately piled EVA film on PET film. As a result of various examinations, the intermediate layer is particularly favorable to have the following five-layer structure from viewpoints of the cost and performances:

| First film | Second film | Third film | Fourth film | Fifth film |
| --- | --- | --- | --- | --- |
| EVA | PET | EVA | PET | EVA |

In this case, the intermediate layer having a good impact resistance is obtained by previously controlling the bonding force of the boundary between the second or fourth PET film and the third EVA film at a low level. After the heating, defoaming and contact bonding according to the actual operation, the bonding force between glass plate and EVA film is 8 kg/cm as measured by 180° peeling test, while the bonding force between the second or fourth PET film and the third EVA film is controlled to not more than 0.04 kg/cm. For this purpose, the surface of PET film facing the third EVA film is treated with the releasing agent, or a proper amount of the releasing agent is previously kneaded into the EVA resin before the formation of the third EVA film.

The releasing agent is selected from lubricants such as stearic acid, calcium hydroxystearate, stearic amide, phosphoric ester and the like, and silicone series releasing agents such as dimethyl polysiloxane and so on.

Of course, three-layer structure of EVA/PET/EVA and other multi-layer structures may be adopted in addition to the above five-layer structure.

According to the invention, sandwich glasses may be manufactured by previously forming a pattern or letters on the whole or local surface of the intermediate layer through printing, dyeing or textile printing, or by depositing a metal or metal oxide onto the intermediate layer through vacuum evaporation or sputtering.

Although the invention has been described in detail with respect to the sandwich structure using a glass plate of a very high brittleness as an outer plate, it is a matter of course that sandwich structures having more improved impact resistance can be obtained when using an outer plate composed of a metal material or organic high polymer having a small brittleness.

According to the invention, the line of breaking force during collision runs along low bonding boundary in the interior of the sandwich structure, so that the impact energy is absorbed by the low bonding boundary to suppress the breaking in a direction perpendicular to the surface of the sandwich structure and hence improve the penetration resistance. Moreover, the sandwich glass is manufactured while holding the bonding force between the glass surface and the intermediate layer at a high level, so that it is possible to reduce the falling off or scattering of sharp broken glass pieces during the collision to a minimum.

The following examples are given in the illustration of the invention and are not intended as limitations thereof.

(i) Preparation of transparent resin sheet

Four kinds of transparent resin compositions were prepared by mixing components shown in the following Table 1 in a roll mill heated at about 80° C. Then, the resulting composition was shaped into a transparent resin sheet having a given thickness by means of a press heated at about 100° C.

TABLE 1

| Compounding recipe (part by weight) | Sheet | | | |
| --- | --- | --- | --- | --- |
| | A | B | C | D |
| EVA *1 | 100 | 100 | 100 | 100 |
| triallyl isocyanulate | — | 5.0 | — | 5.0 |
| dicumyl peroxide | 1.0 | 1.0 | 1.0 | 1.0 |
| γ-methacryloxypropyl trimethoxysilane | 0.3 | 0.3 | 0.3 | 0.3 |
| LTP-2 *2 | — | — | 1.0 | 1.0 |

(Note)
*1: Ultrasen 634, trade name, made by Toyo Soda Kogyo K.K.
*2: Phosporic ester as a lubricant, made by Kawaken Fine Chemical K.K.

(ii) Selection of high-strength material

As a high-strength material was used a polyester film made from polyethylene terephthlate (Tetoton film, made by Teijin K.K., hereinafter referred to as PET*).

(iii) Manufacture of sandwich glass

An intermediate layer was prepared by piling given number of the above transparent resin sheets and PET* films one upon the other with a given thickness and then interposed between two float glasses each previously washed and dried and having a thickness of 3 mm. The resulting glass assembly was placed in a polyethylene terephthalate bag, deaerated under vacuum and subjected to a preliminary contact bonding at about 80° C. for 10 minutes. The thus bonded sandwich glass was taken out from the bag and placed in an oven, which was heated to 150° C. as a glass surface temperature under atmospheric pressure and held at this temperature for 15 minutes to obtain a desired sandwich glass.

(iv) Evaluation for performances (a) The impact test for the sandwich glass was made by dropping a steel ball according to a method of JIS R3212.

(b) The height for penetration resistance is an average value of six samples measured by the impact test.

(c) The test temperature of each sample was 25° C. and 40° C. after being left to stand in a thermostat for more than 4 hours.

EXAMPLE 1

A sandwich glass was manufactured by using an intermediate layer of five-layer structure composed of sheet A of 0.2 mm in thickness/PET* of 0.1 mm in thickness/sheet C of 0.08 mm in thickness/PET* of 0.1 mm in thickness/sheet A of 0.2 mm in thickness. The resulting sandwich glass had an excellent transparency and was free in the optical strain.

EXAMPLE 2

A sandwich glass was manufactured by using an intermediate layer of five-layer structure composed of sheet B of 0.2 mm in thickness/PET* of 0.1 mm in thickness/sheet D of 0.08 mm in thickness/PET* of 0.1 mm in thickness/sheet B of 0.2 mm in thickness. The resulting sandwich glass had an excellent transparency and was free in the optical strain.

EXAMPLE 3

A sandwich glass was manufactured by using an intermediate layer of three-layer structure composed of sheet A of 0.2 mm in thickness/PET* of 0.2 mm in thickness/sheet A of 0.2 mm in thickness, provided that dimethyl polysiloxane (KF-96, made by Shin-Etsu Chemical Industries Co., Ltd.) was applied to each surface of PET* film. The resulting sandwich glass had good optical properties likewise the cases of Examples 1 and 2.

COMPARATIVE EXAMPLE 1

The same procedure as in Example 1 was repeated, except that sheet A of 0.1 mm in thickness was used instead of the intermediate sheet C, to obtain a sandwich glass having no low bonding boundary. The resulting sandwich glass had the same appearance as in Example 1.

COMPARATIVE EXAMPLE 2

The same procedure as in Example 2 was repeated, except that sheet B of 0.1 mm in thickness was used instead of the intermediate sheet D, to obtain a sandwich glass having no low bonding boundary. The resulting sandwich glass had the same appearance as in Example 2.

COMPARATIVE EXAMPLE 3

The same procedure as in Example 3 was repeated, except that the releasing agent was not applied to each of PET* film, to obtain a sandwich glass having no low bonding boundary. The resulting sandwich glass had the same appearance as in Example 3.

COMPARATIVE EXAMPLE 4

A sandwich glass was manufactured in the conventional manner by using an intermediate polyvinyl butyral film of 0.76 mm in thickness.

The evaluation results of these sandwich glasses in Examples 1-3 and Comparative Examples 1-4 are shown in the following Table 2.

TABLE 2

| | Thickness of intermediate layer (mm) | Height for penetration resistance (m) | |
|---|---|---|---|
| | | 25° C. | 40° C. |
| Example 1 | 0.68 | 7 | 7 |
| Example 2 | 0.68 | 7 | 7 |
| Example 3 | 0.6 | 6 | 6 |
| Comparative Example 1 | 0.68 | 5 | 5 |
| Comparative Example 2 | 0.68 | 5 | 5 |
| Comparative Example 3 | 0.6 | 3 | 3 |
| Comparative Example 4 | 0.76 | 6 | 3 |

As seen from Table 2, the sandwich glasses according to the invention develop an excellent penetration resistance when Examples 1-3 are compared with Comparative Examples 1-4. Further, even when the thickness of intermediate layer is thinner (0.68 mm) than that of the conventional polyvinyl butyral film (0.76 mm), the penetration resistance is high. Moreover, the height for penetration resistance in Comparative Example 4 rapidly lowers at 40° C. usually considered under ordinary use environments, while no lowering of the height is caused in the sandwich glasses according to the invention.

As mentioned above, the sandwich glass according to the invention has the following industrial merits:

(1) The high-level penetration resistance and improved resistance to scattering of glass pieces can be maintained over a wide temperature range;

(2) The peeling, falling or scattering amount of broken glass pieces during the collision is very small, so that the higher safety can be guaranteed; and (3) The intermediate layer according to the invention is excellent in the impact resistance, so that the total thickness thereof may be made thinner than the thickness of the conventional polyvinyl butyral film, which is very advantageous in view of the energy-saving and economical reason.

What is claimed is:

1. A sandwich structure having an improved impact resistance, comprising two same or different outer plates and an intermediate layer interposed therebetween; wherein said intermediate layer consists essentially of at least two same or different films so that the bonding force of at least one contact surface between the mutual films is lower than the bonding force of a contact surface between each outermost surface of the intermediate layer and each of the outer plates.

2. The sandwich structure according to claim 1, wherein said intermediate layer consists essentially of at least two films having different breaking strengths.

3. The sandwich structure according to claim 1, wherein said intermediate layer consists essentially of at least two films having different moduli of elasticity.

4. The sandwich structure according to claim 1, wherein at least one of said two outer plates is made from a metal material.

5. The sandwich structure according to claim 1, wherein at least one of said two outer plates is made from a ceramic material.

6. The sandwich structure according to claim 1, wherein at least one of said two outer plates is made from an organic high polymer.

7. The sandwich structure according to claim 4, wherein said metal material is iron.

8. The sandwich structure according to claim 5, wherein said ceramic material is glass.

9. The sandwich structure according to claim 6, wherein said organic high polymer is an FRP material.

10. The sandwich structure according to claim 1, wherein said at least one film constituting the intermediate layer is a transparent film of a material selected from ethylene-vinyl acetate copolymer, partially saponified ethylene-vinyl acetate copolymer, polyvinyl butyral, polyvinyl formal and urethane polymer.

11. The sandwich structure according to claim 1, wherein said at least one film constituting the intermediate layer is a transparent film of polyethylene terephthalate.

12. The sandwich structure according to claim 1, wherein said intermediate layer is a laminate of high transparent films of ethylene-vinyl acetate copolymer and transparent films of polyethylene terephthalate.

* * * * *